US007354074B2

(12) United States Patent
Kosmyna et al.

(10) Patent No.: US 7,354,074 B2
(45) Date of Patent: Apr. 8, 2008

(54) ADAPTER ASSEMBLY FOR A FLUID SUPPLY ASSEMBLY

(75) Inventors: Michael J. Kosmyna, Toledo, OH (US); Ralph A. Wisniewski, Toledo, OH (US)

(73) Assignee: Illinois Tool Works Inc., Glenview, IL (US)

( * ) Notice: Subject to any disclaimer, the term of this patent is extended or adjusted under 35 U.S.C. 154(b) by 259 days.

(21) Appl. No.: 10/860,631

(22) Filed: Jun. 3, 2004

(65) Prior Publication Data

US 2006/0043217 A1 Mar. 2, 2006

(51) Int. Cl.
*F16L 27/04* (2006.01)

(52) U.S. Cl. ............................... 285/139.1; 285/136.1; 285/209; 285/401; 239/345

(58) Field of Classification Search ............ 285/136.1, 285/139.1, 189, 401–402, 414, 209, 361, 285/396; 239/345

See application file for complete search history.

(56) References Cited

U.S. PATENT DOCUMENTS

| | | | |
|---|---|---|---|
| 856,361 | A | 6/1907 | Neiburg |
| D47,721 | S | 8/1915 | Haley |
| 1,476,668 | A | 12/1923 | Agnew, Sr. |
| 1,560,938 | A | 11/1925 | Lund |
| 1,562,196 | A | 11/1925 | Abrams |
| 1,590,172 | A | 6/1926 | Thorberg |
| 1,703,384 | A | 2/1929 | Birkenmaier |
| 1,722,101 | A | 7/1929 | Little |
| 1,800,459 | A | 4/1931 | Maclean |
| 1,843,269 | A | 2/1932 | Capser |
| 2,263,843 | A | 11/1941 | Gross |
| 2,612,404 | A | 9/1952 | Anderson |
| 2,768,660 | A | 10/1956 | Russell |
| 2,770,706 | A | 11/1956 | Vogtle et al. |
| 2,972,438 | A | 2/1961 | Kimbrough |
| 3,157,360 | A | 11/1964 | Heard |
| 3,228,555 | A | 1/1966 | Pinto |
| 3,236,459 | A | 2/1966 | McRitchie |
| 3,255,972 | A | 6/1966 | Hultgren et al. |
| 3,378,183 | A | 4/1968 | Cuellar Ferrer |
| 3,401,842 | A | 9/1968 | Morrison |
| 3,432,104 | A | 3/1969 | Kaltenbach |

(Continued)

FOREIGN PATENT DOCUMENTS

| | | |
|---|---|---|
| CA | 1 192 852 | 9/1985 |

(Continued)

OTHER PUBLICATIONS

Ryne C. Allen, To Shield or Not to Shield, Aug. 1999, Desco Industries, Inc., Marlboro, Massachusetts.

(Continued)

*Primary Examiner*—Aaron Dunwoody
*Assistant Examiner*—Fannie C. Kee
(74) *Attorney, Agent, or Firm*—Dinsmore & Shohl LLP

(57) ABSTRACT

An adapter assembly for connecting a fluid supply assembly to a fluid applicator. The adapter assembly includes an outer lid for the fluid supply assembly and an adapter. The adapter assembly provides a connection between the fluid supply assembly and the fluid applicator that can be engaged quickly, easily, and securely, and which has a strong tight seal around the connection.

21 Claims, 10 Drawing Sheets

U.S. PATENT DOCUMENTS

| | | | | |
|---|---|---|---|---|
| 3,464,590 | A | 9/1969 | Giannettino | |
| 3,554,450 | A | 1/1971 | D'Muhala | |
| 3,593,921 | A | 7/1971 | Boltic | |
| 3,595,464 | A | 7/1971 | Harrison | |
| 3,604,602 | A | 9/1971 | Lee | |
| 3,672,645 | A | 6/1972 | Terrels et al. | |
| 3,674,074 | A | 7/1972 | Lavis | |
| 3,757,718 | A | 9/1973 | Johnson | |
| 3,773,169 | A | 11/1973 | Zahuranec et al. | |
| 3,776,408 | A | 12/1973 | Wald | |
| 3,780,950 | A | 12/1973 | Brennan | |
| 3,892,306 | A | 7/1975 | Schlottmann | |
| 3,934,746 | A | 1/1976 | Lilja | |
| 3,939,888 | A | 2/1976 | Scarnato | |
| 3,940,052 | A | 2/1976 | McHugh | |
| 4,043,510 | A | 8/1977 | Morris | |
| 4,087,021 | A | 5/1978 | Cotugno | |
| 4,094,432 | A | 6/1978 | Ziebert | |
| 4,122,973 | A | 10/1978 | Ahern | |
| 4,140,279 | A | 2/1979 | Hawkins | |
| 4,151,929 | A | 5/1979 | Sapien | |
| 4,159,081 | A | 6/1979 | Demler et al. | |
| 4,258,862 | A | 3/1981 | Thorsheim | |
| 4,269,319 | A | 5/1981 | Rubens | |
| 4,283,082 | A | 8/1981 | Tracy | |
| 4,298,134 | A | 11/1981 | Lewis, Jr. | |
| 4,300,684 | A | 11/1981 | Smith et al. | |
| 4,356,930 | A | 11/1982 | Roper | |
| 4,379,455 | A | 4/1983 | Deaton | |
| 4,383,635 | A | 5/1983 | Yotoriyama | |
| 4,388,997 | A | 6/1983 | Grime | |
| 4,405,088 | A | 9/1983 | Gray | |
| 4,433,812 | A | 2/1984 | Grime | |
| 4,442,003 | A * | 4/1984 | Holt | 210/445 |
| 4,534,391 | A | 8/1985 | Ventimiglia et al. | |
| 4,586,628 | A | 5/1986 | Nittel | |
| 4,609,113 | A | 9/1986 | Seki | |
| 4,634,003 | A | 1/1987 | Ueda et al. | |
| 4,752,146 | A | 6/1988 | Buckle | |
| 4,760,962 | A * | 8/1988 | Wheeler | 239/289 |
| 4,773,569 | A | 9/1988 | Larsson | |
| 4,805,799 | A | 2/1989 | Robbins, III | |
| 4,811,904 | A | 3/1989 | Ihmels et al. | |
| 4,909,409 | A | 3/1990 | Shreve | |
| 4,930,644 | A | 6/1990 | Robbins, III | |
| 4,936,511 | A | 6/1990 | Johnson et al. | |
| 4,946,075 | A | 8/1990 | Lundback | |
| 4,951,875 | A | 8/1990 | Devey | |
| 4,971,251 | A | 11/1990 | Dobrick et al. | |
| 5,035,339 | A | 7/1991 | Meyersburg | |
| 5,059,319 | A | 10/1991 | Welsh | |
| 5,060,816 | A | 10/1991 | Robbins, III | |
| 5,067,518 | A | 11/1991 | Kosmyna | |
| 5,069,389 | A | 12/1991 | Bitsakos | |
| 5,088,614 | A | 2/1992 | Dumestre | |
| 5,094,543 | A | 3/1992 | Mursa | |
| 5,143,294 | A | 9/1992 | Lintvedt | |
| 5,163,580 | A | 11/1992 | Beach et al. | |
| 5,167,327 | A | 12/1992 | Mondello | |
| 5,195,794 | A | 3/1993 | Hummel, Jr. et al. | |
| 5,209,365 | A | 5/1993 | Wood | |
| 5,209,501 | A | 5/1993 | Smith | |
| 5,253,781 | A | 10/1993 | Van Melle et al. | |
| 5,271,683 | A | 12/1993 | Snetting et al. | |
| 5,328,486 | A | 7/1994 | Woodruff | |
| 5,429,263 | A | 7/1995 | Haubenwallner | |
| 5,460,289 | A | 10/1995 | Gemmell | |
| 5,468,383 | A | 11/1995 | McKenzie | |
| 5,501,365 | A | 3/1996 | Richiger et al. | |
| 5,514,299 | A | 5/1996 | Kalwara | |
| 5,553,748 | A | 9/1996 | Battle | |
| 5,569,377 | A | 10/1996 | Hashimoto | |
| 5,582,350 | A | 12/1996 | Kosmyna et al. | |
| 5,601,212 | A | 2/1997 | Lee | |
| 5,617,972 | A | 4/1997 | Morano et al. | |
| 5,628,428 | A | 5/1997 | Calhoun et al. | |
| 5,655,714 | A | 8/1997 | Kieffer et al. | |
| D386,654 | S | 11/1997 | Kosmyna | |
| 5,713,519 | A | 2/1998 | Sandison et al. | |
| 5,727,699 | A | 3/1998 | Gilcrease | |
| 5,769,266 | A | 6/1998 | Willbrandt | |
| 5,797,520 | A | 8/1998 | Donahue | |
| 5,803,367 | A | 9/1998 | Heard et al. | |
| 5,806,711 | A | 9/1998 | Morano et al. | |
| 5,810,258 | A | 9/1998 | Wu | |
| 5,816,501 | A | 10/1998 | LoPresti et al. | |
| 5,853,102 | A | 12/1998 | Jarrett | |
| 5,865,341 | A | 2/1999 | Martin | |
| 5,894,927 | A | 4/1999 | Bennett | |
| 5,918,815 | A | 7/1999 | Wu | |
| 5,975,346 | A | 11/1999 | Imperato et al. | |
| 6,012,651 | A | 1/2000 | Spitznagel | |
| 6,019,294 | A | 2/2000 | Anderson et al. | |
| 6,053,314 | A | 4/2000 | Pittman | |
| 6,053,429 | A | 4/2000 | Chang | |
| 6,123,222 | A | 9/2000 | Richiger et al. | |
| 6,136,396 | A | 10/2000 | Gilmer | |
| 6,165,159 | A | 12/2000 | Blanton | |
| 6,189,809 | B1 | 2/2001 | Schwebemeyer | |
| 6,196,410 | B1 | 3/2001 | Hocking | |
| 6,213,410 | B1 | 4/2001 | Spitznagel | |
| 6,257,429 | B1 | 7/2001 | Kong | |
| 6,302,445 | B1 | 10/2001 | Kugele et al. | |
| 6,331,334 | B1 | 12/2001 | Trepte et al. | |
| 6,382,449 | B1 | 5/2002 | Kazmierski et al. | |
| 6,401,967 | B1 | 6/2002 | Rabe et al. | |
| 6,435,426 | B1 | 8/2002 | Copp, Jr. | |
| D466,755 | S | 12/2002 | Henry | |
| 6,516,799 | B1 | 2/2003 | Greenwood et al. | |
| 6,536,687 | B1 | 3/2003 | Navis et al. | |
| 6,572,179 | B2 | 6/2003 | Dahl et al. | |
| 6,588,681 | B2 | 7/2003 | Rothrum et al. | |
| 6,595,441 | B2 | 7/2003 | Petrie et al. | |
| 6,663,018 | B2 | 12/2003 | Rothrum et al. | |
| 6,698,670 | B1 | 3/2004 | Gosis et al. | |
| 6,702,143 | B2 | 3/2004 | Wang | |
| 6,718,664 | B2 | 4/2004 | Williams | |
| 6,736,538 | B2 | 5/2004 | Bittner | |
| 6,796,514 | B1 | 9/2004 | Schwartz | |
| 6,820,824 | B1 | 11/2004 | Joseph et al. | |
| 6,886,707 | B2 | 5/2005 | Giraud | |
| 6,976,604 | B2 | 12/2005 | Connors et al. | |
| 7,086,549 | B2 | 8/2006 | Kosmyna et al. | |
| 7,090,455 | B2 | 8/2006 | Lamb | |
| 7,093,714 | B2 | 8/2006 | Huang | |
| 7,165,732 | B2 | 1/2007 | Kosmyna et al. | |
| 7,219,811 | B2 | 5/2007 | Kong | |
| 7,263,893 | B2 | 9/2007 | Kosmyna et al. | |
| 2002/0084273 | A1 | 7/2002 | Ming | |
| 2002/0134861 | A1* | 9/2002 | Petrie et al. | 239/345 |
| 2002/0175171 | A1 | 11/2002 | Stewart et al. | |
| 2003/0006310 | A1 | 1/2003 | Rothrum et al. | |
| 2003/0006311 | A1* | 1/2003 | Rothrum et al. | 239/328 |
| 2003/0209568 | A1 | 11/2003 | Douglas et al. | |
| 2003/0209573 | A1 | 11/2003 | Bouic | |
| 2003/0213857 | A1 | 11/2003 | Schmon et al. | |
| 2004/0016825 | A1 | 1/2004 | Petrie et al. | |
| 2004/0046051 | A1 | 3/2004 | Santa Cruz et al. | |
| 2004/0069791 | A1 | 4/2004 | Neal | |
| 2004/0217201 | A1* | 11/2004 | Ruda | 239/376 |
| 2004/0256484 | A1 | 12/2004 | Joseph et al. | |
| 2004/0256485 | A1 | 12/2004 | Joseph et al. | |
| 2005/0242107 | A1 | 11/2005 | Kosmyna et al. | |
| 2005/0263614 | A1* | 12/2005 | Kosmyna et al. | 239/345 |

| | | | |
|---|---|---|---|
| 2005/0279748 | A1 | 12/2005 | Kosmyna |
| 2006/0003059 | A1 | 1/2006 | Tabora |
| 2006/0017286 | A1 | 1/2006 | Kosmyna et al. |
| 2006/0049277 | A1 | 3/2006 | Joseph et al. |
| 2006/0102550 | A1 | 5/2006 | Joseph et al. |
| 2006/0144960 | A1 | 7/2006 | Kosmyna et al. |
| 2006/0180075 | A1 | 8/2006 | Kosmyna et al. |
| 2006/0180584 | A1 | 8/2006 | Kosmyna et al. |
| 2006/0226145 | A1 | 10/2006 | Kosmyna et al. |
| 2006/0249597 | A1 | 11/2006 | Kosmyna et al. |
| 2006/0283861 | A1 | 12/2006 | Kosmyna et al. |

FOREIGN PATENT DOCUMENTS

| | | | |
|---|---|---|---|
| CA | 2099763 | | 7/1992 |
| CH | 540 159 | A | 2/1972 |
| CH | 688082 | A | 5/1997 |
| DE | 204036 | | 11/1908 |
| DE | 2900998 | A | 7/1980 |
| DE | 3507 734 | A1 | 9/1986 |
| DE | 41 02 326 | A1 | 7/1992 |
| DE | 42 09 258 | A1 | 9/1993 |
| DE | 196 18 514 | A1 | 11/1997 |
| DE | 201 17 496 | U1 | 2/2002 |
| EP | 0 636 548 | A1 | 2/1995 |
| EP | 0 678 334 | A2 | 10/1995 |
| EP | 0987060 | | 3/2000 |
| EP | 1 210 181 | B1 | 10/2003 |
| EP | 1 415 719 | A1 | 5/2004 |
| EP | 1 424 135 | A1 | 6/2004 |
| EP | 1 435 265 | A2 | 7/2004 |
| EP | 1 368 129 | | 6/2005 |
| EP | 1 611 960 | A1 | 1/2006 |
| FR | 1 282 085 | | 12/1960 |
| FR | 2 639 324 | A | 5/1990 |
| FR | 2 774 928 | | 2/1998 |
| FR | 2774922 | A1 | 8/1999 |
| FR | 2798868 | A1 | 3/2001 |
| GB | 961183 | | 6/1964 |
| GB | 2 103 173 | A | 2/1983 |
| GB | 2170471 | A | 8/1986 |
| JP | 06 335643 | A | 12/1994 |
| JP | 7-289956 | | 11/1995 |
| JP | 8-192851 | | 7/1996 |
| JP | 10-7170 | A | 1/1998 |
| JP | 2001-252599 | | 9/2001 |
| WO | WO 92/11930 | | 7/1992 |
| WO | WO 95/07762 | | 3/1995 |
| WO | WO 95/11170 | | 4/1995 |
| WO | WO 95/22409 | | 8/1995 |
| WO | WO 98/00796 | | 1/1998 |
| WO | WO 98/32539 | | 7/1998 |
| WO | WO 99/06301 | | 2/1999 |
| WO | WO 99/50153 | | 10/1999 |
| WO | WO 01/12337 | A1 | 2/2001 |
| WO | WO 02/072276 | A1 | 9/2002 |
| WO | WO 02/085533 | A1 | 10/2002 |
| WO | WO 03/006170 | A2 | 1/2003 |
| WO | WO 03/045575 | A1 | 6/2003 |
| WO | WO 03/082475 | A1 | 10/2003 |
| WO | WO 03/095100 | | 11/2003 |
| WO | WO 03/095101 | A1 | 11/2003 |
| WO | WO 2004/037431 | A1 | 5/2004 |
| WO | WO 2004/037432 | A1 | 5/2004 |
| WO | WO 2004/037433 | A1 | 5/2004 |
| WO | WO 2004/052552 | A1 | 6/2004 |
| WO | WO 2004/060574 | | 7/2004 |
| WO | WO 2004/060575 | | 7/2004 |
| WO | WO 2004/082848 | | 9/2004 |
| WO | WO 2004/087332 | A1 | 10/2004 |
| WO | WO 2004/094072 | | 11/2004 |
| WO | WO 2004/098785 | | 11/2004 |
| WO | WO 2005/018815 | | 3/2005 |
| WO | WO 2005/068220 | | 7/2005 |
| WO | 2005/070557 | A1 | 8/2005 |
| WO | WO 2005/075097 | A1 | 8/2005 |
| WO | WO 2005/077543 | | 8/2005 |
| WO | 2006/041589 | A2 | 4/2006 |
| WO | WO 2006/065850 | A1 | 6/2006 |

OTHER PUBLICATIONS

Steve Fowler, OHMS Per Square What?, ESD & Electostatics Magazine, May 2004.

Anti-Static and Conductive Plastics; ESD Materials Categories; Boedeker Plastics, Inc.; Shiner, Texas; http://www.boedeker.com; May 17, 2004.

Ryne C. Allen; ESD Bags: To Shield or Not to Shield: What Type of Bag Should You Use?; Aug. 1999; ESD Systems; Marlboro, MA; http://esdtraining.esdsystems.com.

Typical Conductive Additives; RTP Company; http://www.rtpcompany.com; May 17, 2004.

Lilli Manolis Sherman; Polymers as Additives; Gardner Publications, Inc.; http://www.plasticstechnology.com; May 17, 2004.

Markus C. Grob and Doris Eisermann; Permanent Antistats: New Developments for Polyolefin Applications; Best Paper-Polyolefins XI-1999; Ciba Specialty Chemicals Inc.; Basel Switzerland; http://www.pmad.org/tecpaper-pXI.html; May 17, 2004.

Steve Fowler; OHMS Per Square What?; ESD Journal—The ESD & Electostatics Magazine; http://www.esdjournal.com; May 17, 2004.

Antistatic Agent; About, Inc.; http://composite.about.com/library/glossary/a/bldef-a375.htm; May 17, 2004.

ANTISTATS; http://www.ampacet.com/tutorial/antistat/as_long.htm, May 17, 2004.

ADDITIVES; http://www.csuchico.edu/~jpgreene/itec041/m41_ch05/tsld011.htm, May 17, 2004.

Non-electrical Equipment for Potentially Explosive Atmospheres Part 1: Basic Method and Requirements; BSi (British Standards Institution) BS EN 13465-1:2001; European Standard Nov. 2001.

Insulation Resistance Test of Parts of Enclosures of Plastic Materials; EN 50014: 1992; pp. 20-21; 1992.

Recommended Practice of Static Electricity; NFPA 77; 2000 Edition; pp. 77-3-77-11, 77-13-77-15, 77-20-77-21, 77-24-77-25, 77-31, 77-49, 77-51-77-54.

DeVilbiss Brochure: Tanks and Cups; 1997; pp. 1, 10.

DeVilbiss 2000 Service Bulletin (SB-21-058-F): 2 Gallon QMG Tanks (Galvanized); 2000; pp. 1-8; U.S.A.

DeVilbiss 2000 Service Bulletin (SB-21-062-F): 5, 10, 15 Gallon QMG Tanks (Galvanized); 2000; pp. 1-8, U.S.A.

DeVilbiss 2000 Service Bulletin (SB-21-064-F): 5, 10, 15 Gallon QMG Tanks (Stainless Steel); 1997; pp. 1-8; U.S.A.

* cited by examiner

ADAPTER ASSEMBLY FOR A FLUID SUPPLY ASSEMBLY

BACKGROUND OF THE INVENTION

The present invention is directed generally to a fluid supply assembly for a fluid applicator, and more particularly to an adapter assembly for connecting a fluid supply assembly to a fluid applicator.

Typically, the connection between a fluid supply assembly and a fluid applicator, such as a paint sprayer for automobile painting and repainting in body shops, is via an adapter between the fluid supply assembly and the fluid applicator, such as with a threaded connection between the supply cup and the adapter. However, it is difficult to prevent leaking from threaded connections without precise machining of the threads or the use of seals, particularly for threaded connections having a short length.

Attempts have been made to create a connection between a supply cup and an adapter that can be engaged and disengaged quickly and easily. U.S. Pat. Nos. 6,356,687 and 6,595,441 disclose a connection between a paint cup and an adapter which has several parts. However, the adapter can be rotated without being fully inserted. Thus, the adapter may appear to be securely connected to the paint cup when it is not. An improper connection can result in the paint cup falling off the paint sprayer, creating a mess. Moreover, the connections described in these patents are unnecessarily complex.

SUMMARY OF THE INVENTION

Therefore, there remains a need for a connection between a fluid supply assembly and an adapter that can be engaged quickly, easily, and securely, and that provides a strong tight seal around the connection.

The present invention meets this need by providing an adapter assembly for connecting a fluid supply assembly to a fluid applicator. The adapter assembly includes an outer lid for the fluid supply assembly, the outer lid having an integral generally cylindrical fitting with an opening therethrough, the fitting having a connector on an inner surface, the connector selected from projections or grooves; and an adapter having a first end and a second end, and a bore between the first end and the second end, the first end having a connecting surface adapted to mate with a complementary connecting surface on the fluid applicator, the second end being generally cylindrical and having a top adjacent to the first end and a bottom at an opposite end from the top, the second end having a complementary connector on an outer surface, the complementary connector selected from complementary grooves or complementary projections, the complementary connector adapted to mate with the connector on the fitting.

Another aspect of the invention is a method of connecting a fluid supply assembly to a fluid applicator.

DETAILED DESCRIPTION OF THE INVENTION

Figure 1:
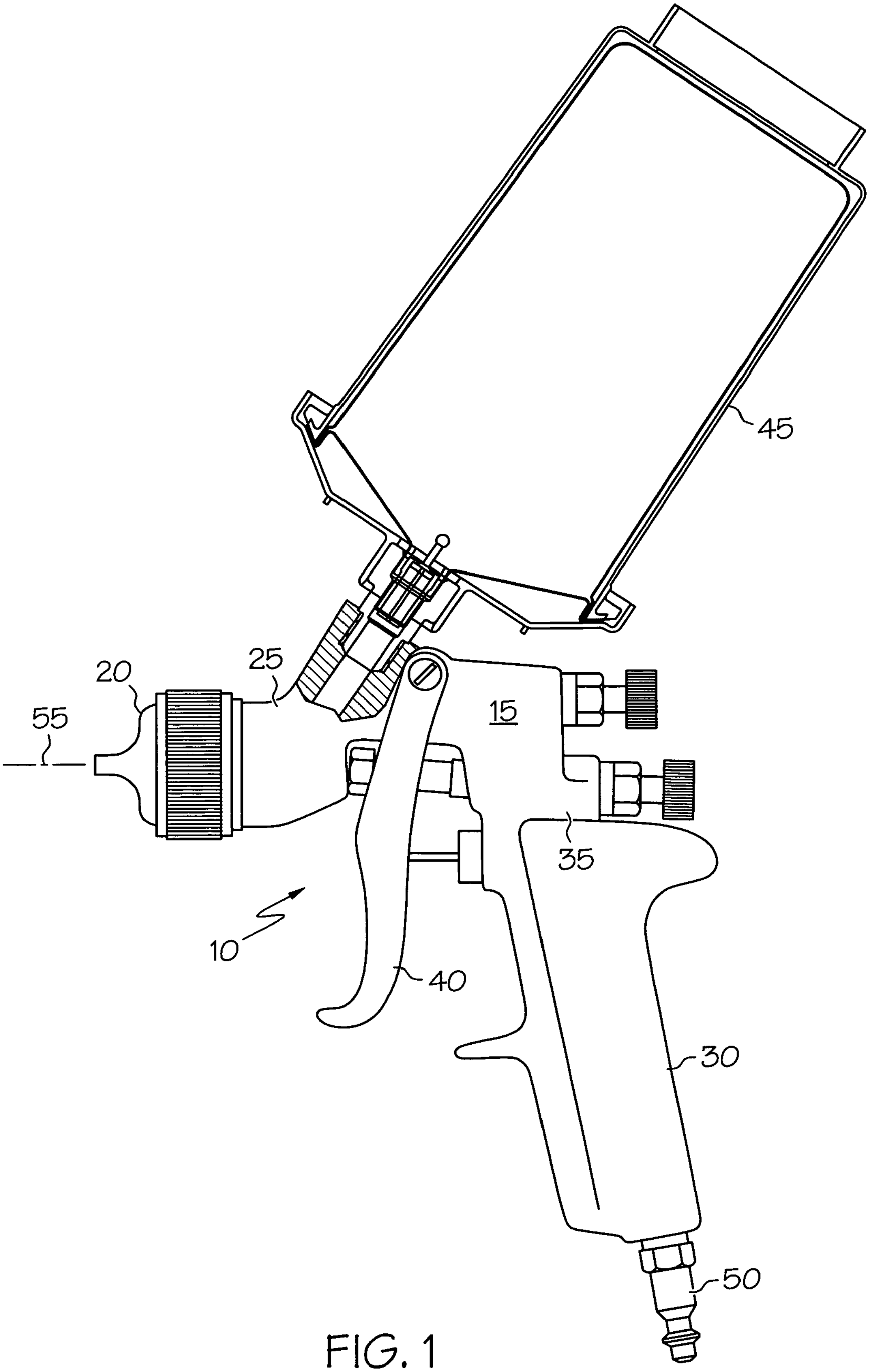
FIG. 1 is side elevation view of a gravity-feed paint sprayer with a fluid supply assembly.

A fluid supply assembly attached to a fluid applicator is shown in FIG. 1. In one embodiment, the fluid supply assembly is for feeding liquid, such as paint, to the fluid applicator, such as a paint sprayer. The present invention will be described for a paint sprayer, such as a gravity feed paint sprayer, for use in applying paint to coat substrate surfaces. The paint sprayer can be used in the automotive refinishing market, such as automobile body shops, for repainting automobiles. Although the fluid supply assembly is described for a paint sprayer, it is not limited to such use. It can be used for supplying other flowable liquids, including, but not limited to, beverages, foods, condiments (such as ketchup), gasoline, petrochemicals and hydrocarbons, water, water-based solutions, solvent-based solutions, emulsions, adhesives, and the like.

Referring to FIG. 1, a paint sprayer 10 is shown. It includes a body 15, a nozzle assembly 20 secured to a front end 25 of body 15, and a handle 30 depending from a rear end 35 of body 15. A trigger 40 is pivotally secured to body 15 for the manual actuation of sprayer 10. A top-mounted paint supply assembly 45 is mounted to body 15 near front end 25 for feeding paint to nozzle assembly 20. An air connector 50 is connected to an air hose (not shown) for the delivery of pressurized air to nozzle assembly 20, wherein the delivery of pressurized air is controlled by trigger 40.

Compressed air from air connector 50 is delivered through an internal passage (not shown) to nozzle assembly 20, and the compressed air acts to atomize paint and deliver it through nozzle assembly 20 to spray paint about paint axis 55. Paint is delivered to nozzle assembly 20 from paint supply assembly 45.

FIGS. 11-14 show one embodiment of the adapter assembly of the present invention. The adapter assembly includes adapter 505 for connecting between paint sprayer and outer lid 508 (shown in FIG. 12). Adapter 505 includes a first end 510 engageable with a paint sprayer a second end 515 engageable with outer lid 508, and a hollow bore 520 between first end 510 and second end 515.

Figure 18:
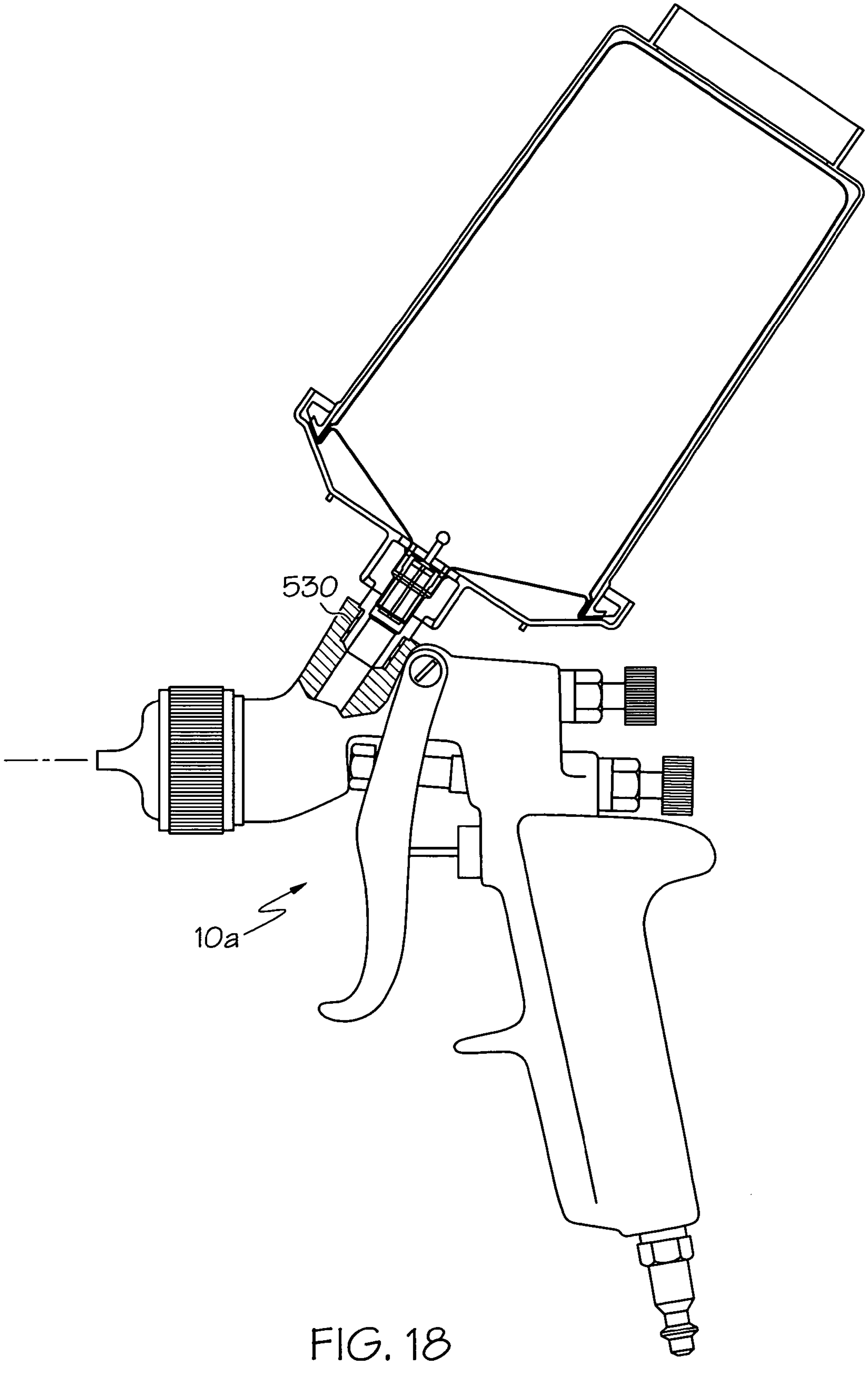
FIG. 18 is a side elevation view of a gravity-feed paint sprayer with a fluid supply assembly.

In one embodiment, first end 510 has a diameter smaller than second end 515. First end 510 is generally cylindrical in shape. First end 510 has a connecting surface 525 for engaging with a complementary connecting surface 530 on the paint sprayer 10*a*, shown in FIG. 18. Suitable connecting surface 525 and complementary connecting surface 530 include, but are not limited to, threading helical surfaces, lugs and grooves, tapered connections, bayonet connections, snap connections, or first end 510 can be integral with paint sprayer 10 so that the adapter 505 is a feed conduit into sprayer 10. Desirably, the connecting surface 525 and complementary connecting surface 530 are threads of a typical size and pitch for paint sprayers so that the fluid assembly can be used with any of several sprayers.

There can be one or more grooves 535 on the outside of the second end 515 extending from the bottom 540 toward the top 545. The grooves 535 form an angle a with respect to the plane of the bottom 540 of the second end 515. A portion of the grooves 535 can form a helix around the outside of the second end 515. The grooves 535 can optionally include a portion 550 which can form an angle b with respect to the plane of the groove 535. The portion 550 can be parallel to the plane of the bottom 540 of the second end 515, or it can form an angle with respect to the bottom 540 of the second end 515, if desired. In order to form a secure connection, more than one groove can be used; two, three, or four grooves are suitable for most applications, although more can be used if desired.

As shown in Fia. 12, the outer lid 508 has an integral generally cylindrical fitting 555 with an opening 560 therethrough. The opening 560 is generally circular. The opening 560 in the outer lid 508 has projections 565 extending inward at the upper end of the opening 560. The projections 565 can be positioned at the edge of the upper end of the fitting 555 or below the edge, if desired. The projections 565 are typically rod-shaped, but they can be any desired shape. The number of projections will correspond to the number of grooves.

When the second end 515 is positioned in fitting 555, the bottom 540 of the second end 515 will enter the fitting 555 until it reaches projections 565. This centers the adapter 505 in the opening 560 of the fitting 555. The adapter 505 can be rotated until the grooves 535 in the second end align with projections 565. Alternatively, the outer lid 508 could be rotated onto the adapter 505.

The second end 515 can then be rotated further so that the projections 565 follow the grooves 535 which moves the second end 515 into the fitting 555 and onto the fitting 570 of the disposable lid 575. When the projections 565 reach portion 550, the second end 515 is engaged with the fitting 555. If the portion 550 is parallel to the bottom 540 of the second end 515, further rotation of the second end 515 causes the projections 565 to follow portion 550, locking the second end 515 in the fitting 555 without the second end 515 moving further into the fitting 555. The adapter's rotation will stop when it reaches the end of the portion 550. This arrangement allows the adapter to be "unscrewed" slightly without it raising off the disposable lid 575. Thus, accidental bumping of the adapter will not cause it to start disengaging the connection immediately. When the adapter is "unscrewed" to remove the cup, the presence of a portion 550 which is parallel to the bottom 540 of the second end 515 allows the adapter to be removed slowly and gradually, which reduces the likelihood of residual paint be spattered during removal.

If the portion 550 is not parallel to the bottom 540 of the second end 515, rotating the second end 515 will move the second end 515 further into the fitting 555.

Optionally, when the adapter is almost inserted completely, the adapter can have an interference fit with the fitting 555. The fitting 555 can be slightly smaller near the bottom to give the feel of a snug fit as the second end 515 nears the locking point between the adapter and the outer lid. The fitting 555 can have a smaller diameter all of the way around, or it can have only some portions which are smaller.

Figure 12:
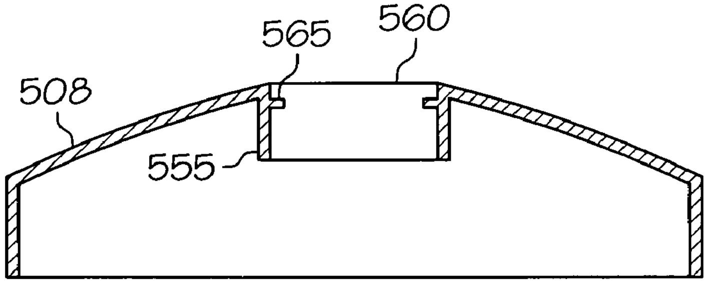
FIG. 12 is a side sectional view of one embodiment of the outer lid.
Figure 13:
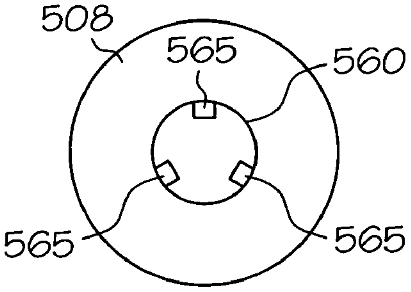
FIG. 13 is a top view of the outer lid of FIG. 12.
Figure 14:
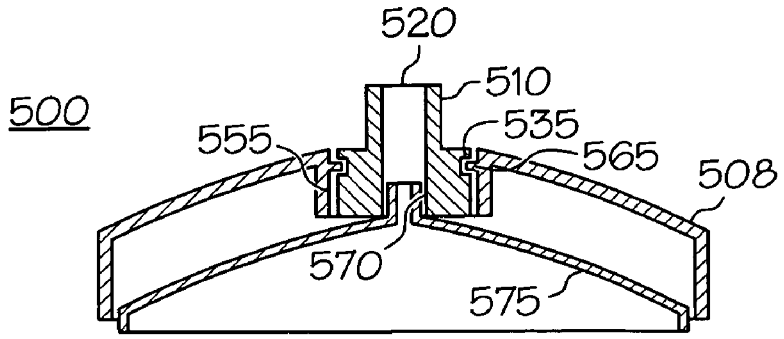
FIG. 14 is a partial assembled side sectional view of the connection between one embodiment of an adapter and reusable outer lid.
Figure 15:
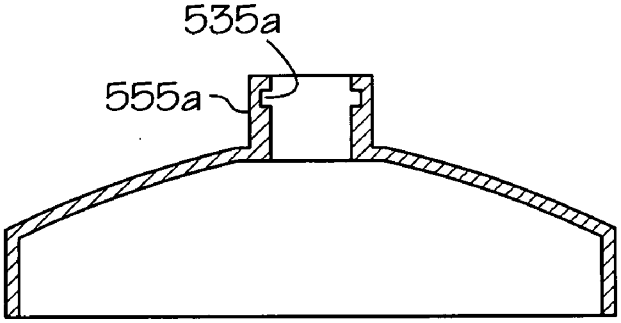
FIG. 15 is a side sectional view of another embodiment of the outer lid.

The fitting can extend downward from the top of the outer lid (as shown in FIG. 12), or it can extend upward from the top (as shown in FIG. 15), as desired.

Figure 16:
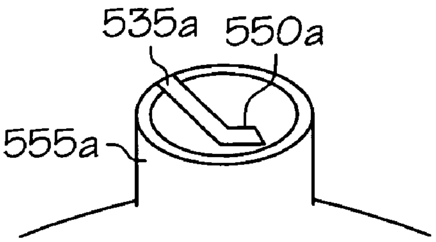
FIG. 16 is a perspective view of the embodiment of the reusable outer lid of FIG. 15.
Figure 17:
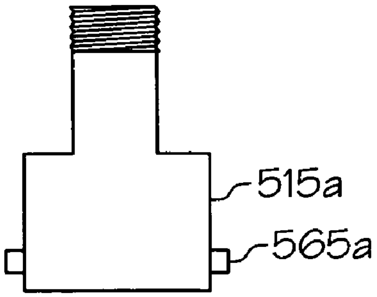
FIG. 17 is a side view of another embodiment of the adapter to be used with the outer lid of FIGS. 15 and 16.

Alternatively, as shown in FIGS. 15-17, the second end 515*a* can include projections 565*a*, and the fitting 555*a* can include grooves 535*a*. In this arrangement, the projections 565*a* could be at the bottom of the second end 515*a* or slightly above the bottom. The grooves 535*a* would extend downward from the top of the fitting 555*a* toward the bottom. The portion 550*a* of the groove 535*a* would be near the bottom of the fitting 555*a*. The operation would be similar to that described above.

The adapter can be made of metal, if desired.

The adapter assembly of the present invention can be used with any fluid supply assembly which has an outer lid with a fitting as described herein. It is particularly suitable for use with the fluid supply assembly described in commonly assigned application for Fluid Supply Assembly, application Ser. No. 10/759,352 filed Jan. 16, 2004, the disclosure of which is incorporated herein by reference.

Figure 2:
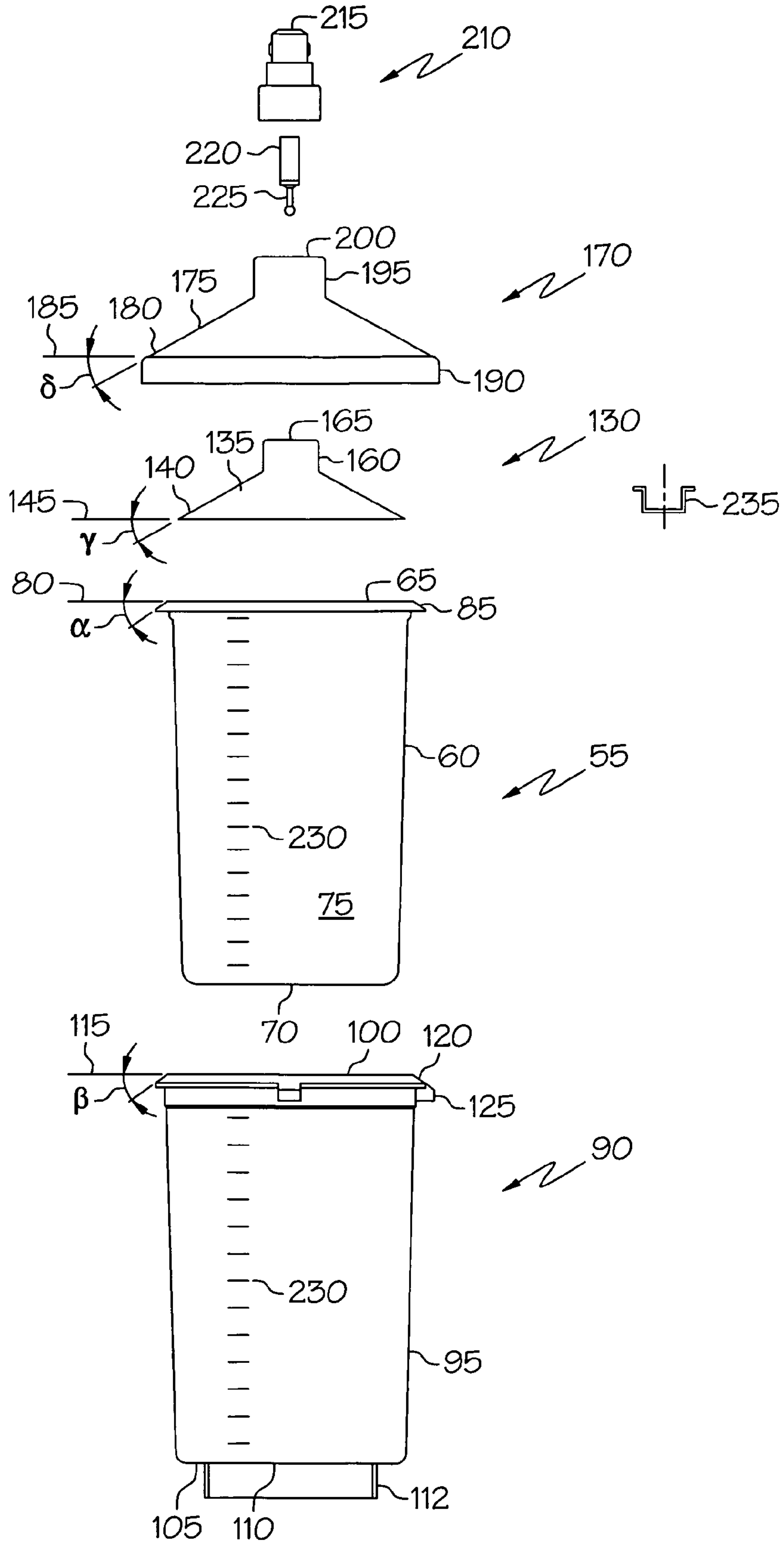
FIG. 2 is an exploded side sectional view of one embodiment of a fluid supply assembly.
Figure 3:
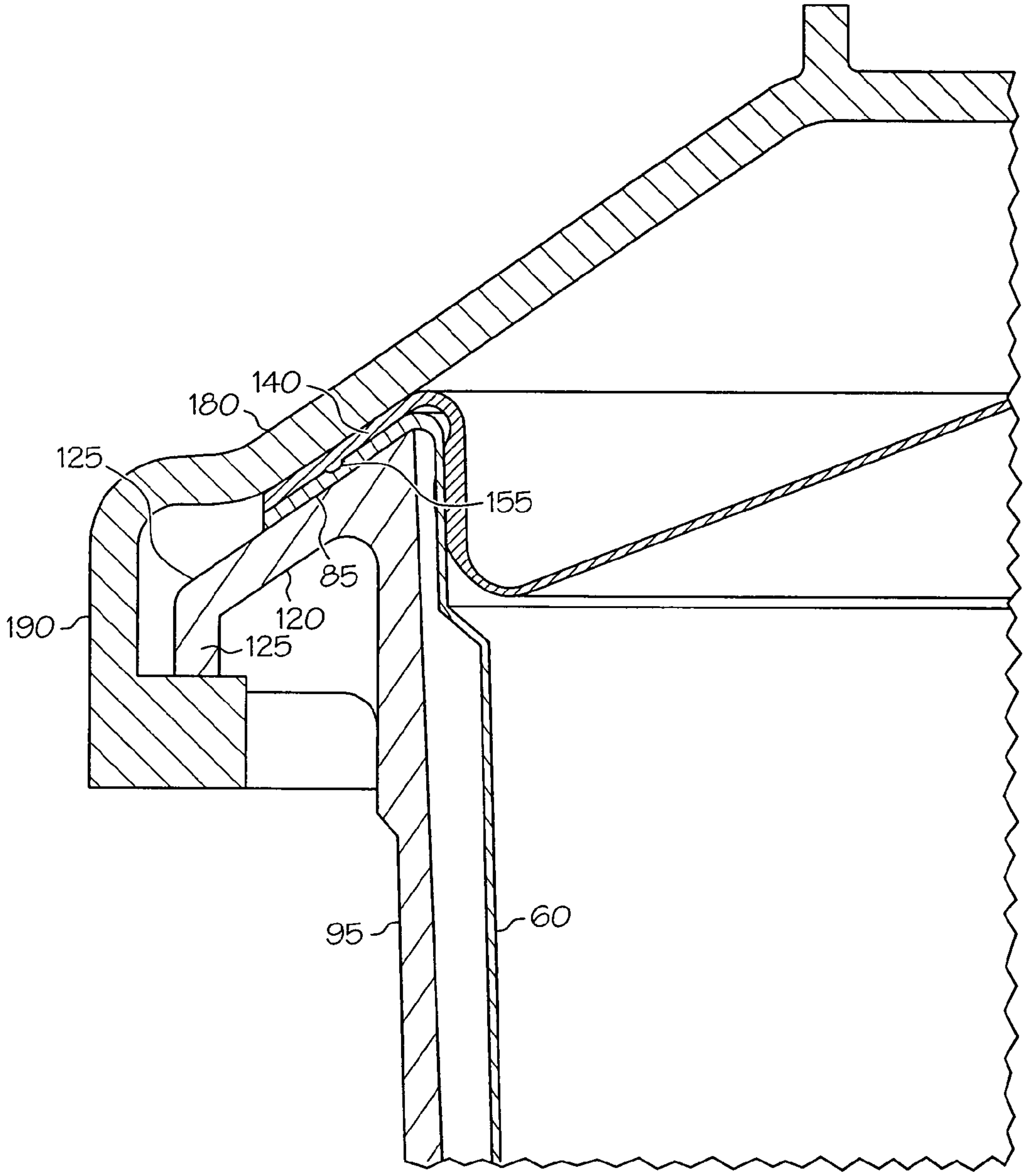
FIG. 3 is partial side sectional view of the assembled connection between the reusable cup holder and reusable outer lid.

FIGS. 1-3 show a first embodiment of paint supply assembly 45 of the present invention. As shown in FIG. 2, the paint supply assembly includes disposable cup 55. Disposable cup 55 has a side wall 60 which is generally cylindrical. The outlet end 65 at the top of the cup is open, and the bottom 70 is closed. The side wall 60, outlet end 65, and bottom 70 define an interior 75. The outlet end 65 defines an axis 80. There is a flange 85 extending outward and downward from the edge of the outlet end 65. The flange 85 extends downward at an angle $\alpha$ in a range of from about 10° to about 70° from the axis 80 of the outlet end 65.

The disposable cup 55 can be made of transparent or translucent plastic if desired. Suitable plastics include, but are not limited to, low density polyethylene. The disposable cup has flexible side walls which allow the disposable cup to collapse as paint is dispensed. The side walls can be thin, for example in the range of about 0.003 in. to about 0.008 in. The bottom can be slightly thicker, in the range of about 0.003 to about 0.02 in., so that the bottom will remain substantially flat as the side walls collapse, if desired. No air vent is needed in the disposable cup because the side walls collapse. This allows the user to discharge the paint sprayer at any angle without leaks and to use more of the paint in the cup than is possible with conventional gravity feed paint cups.

Reusable cup holder 90 is generally cylindrical. It has a side wall 95, an open upper end 100, and a lower end 105. The lower end 105 has an opening 110 in it. The opening 110 can cover all or almost all of the lower end 105, if desired.

Alternatively, the lower end could have one or more smaller openings. The opening 110 in the lower end 105 allows ambient air pressure to help the disposable cup collapse during use. Optionally, the reusable cup holder 90 can include one or more legs 112 extending downward from the lower end 105. The legs can extend all of the way around the opening 110 (i.e., a circular rib) or only a part of the way around the opening 110. The legs 112 can assist in stacking the fluid supply assemblies as described below.

The upper end 100 defines an axis 115. A flange 120 extends outward and downward from an edge of the upper end 100. The flange 120 extends downward at an angle β in a range of from about 10° to about 70° from the axis 115 of the upper end 100. The angle β is substantially the same as the angle α of the flange 85 of disposable cup 55. When the disposable cup 55 is placed in the reusable cup holder 90, the flange 120 of reusable cup holder 90 supports the flange 85 of the disposable cup 55.

There is a connecting surface 125 at the upper end 100 of the reusable cup holder 90. The connecting surface 125 can be on the sidewall, extend out from the side wall, or it can extend outward from the end of the flange 120, if desired.

The reusable cup holder 90 can be made of a rigid plastic, including, but not limited to, polypropylene or high density polyethylene. Desirably, the plastic selected is strong enough that the reusable cup holder can withstand the clamping force of a paint shaker machine. The plastic is desirably transparent or translucent, although it could be opaque. If an opaque plastic is used, the side wall should have elongated openings in it so that the disposable cup and its contents can be seen. Typically, the walls can be in the range of from about 0.02 in. to about 0.08 in. thick.

The disposable lid 130 has a generally frustoconical portion 135. The outer edge 140 of the generally frustoconical portion 135 defines an axis 145. The angle γ of the outer edge 140 of the generally frustoconical portion 135 is in a range of from about 10° to about 70° from the axis 145. The angle γ is substantially the same as the angle α of the flange 85 of disposable cup 55. The disposable lid 130 fits over the disposable cup 55, and the edge 140 of the disposable lid 130 mates with the flange 85 of the disposable cup 55. The inside of the disposable lid 130 can have a downward extending rib 150, if desired. The downward extending rib 150 extends into the interior 75 of the disposable cup and mates with the inside of the side wall 60 of the disposable cup 55, forming a seal. Additionally, there can be a downwardly projecting sealing bead 155 on the inside of the disposable lid 130. The downwardly projecting sealing bead 155 mates with the flange 85 of the disposable cup 55 to aid in forming a seal.

There is a fitting 160 integrally connected to the generally frustoconical portion 135. The fitting 160 has an opening 165 extending through it.

The disposable lid 130 can be made of a transparent, translucent, or opaque plastic. Suitable plastics include, but are not limited to, polypropylene or high density polyethylene.

The reusable outer lid 170 has a generally frustoconical portion 175. The outer edge 180 of the generally frustoconical portion 175 defines an axis 185. The angle δ of the outer edge 180 of the generally frustoconical portion 175 is in a range of from about 10° to about 70° from the axis 185. The angle δ is substantially the same as the angle β of the flange 120 of reusable cup holder 90. The outer edge 180 of the reusable outer lid 170 mates with the flange 120 of the reusable cup holder 90. There is a complementary connecting surface 190 at the outer edge 180 of the reusable outer lid 170. In this embodiment, the complementary connecting surface 190 extends downward from the outer edge 180, although other arrangements are possible. The complementary connecting surface 190 mates with the connecting surface 125 of the reusable cup holder 90 to seal the reusable cup holder 90 and reusable outer lid 170 together.

The reusable outer lid has a fitting 195 integrally connected to the generally frustoconical portion 175. The fitting 195 has an opening 200 extending through it. The fitting 160 of the disposable lid 130 fits into the fitting 195 of the reusable outer lid 170.

The reusable outer lid 170 can be made of a strong, tough plastic. Desirably, the plastic selected is strong enough that the reusable outer lid can withstand the clamping force of a paint shaker machine. Examples of suitable plastic include, but are not limited to, acetal. Acetal is not typically transparent. Therefore, the reusable outer lid 170 can include one or more sight holes so that the paint level is visible to the user, if desired. The sight hole can also allow the user to write the name of the name of the paint type on the disposable lid, and it permits easy removal of the disposable lid from the reusable outer lid.

A conduit 210 connects the fluid supply assembly to the paint sprayer 10. The conduit 210 mates with the fitting 195 of the reusable outer lid 170 and the fitting 160 of the disposable lid 130. The conduit 210 has an opening 215 through it. There is a path for fluid to flow from the interior 75 of the disposable cup 55 through the opening 165 in the disposable lid 130 through the opening 215 in conduit 210 to the paint sprayer 10. An optional filter 220 can be placed into the opening 215 in the conduit 210, the opening 200 in the reusable outer lid 170, or the opening 165 in the disposable lid 130 to filter out impurities.

In order to use the fluid supply assembly, the disposable cup 55 is placed into the reusable cup holder 90. The flange 85 of the disposable cup 55 mates with the flange 120 of the reusable cup holder 90. The flange 85 centers the disposable cup 55 in the reusable cup holder 90.

Optionally, there can be indicia 230 on either the disposable cup 55 or the reusable cup holder 90 or both. The indicia 230 can be molded in the side, printed on the side, a label can be attached to the side, or the indicia can be supplied in some other fashion. The indicia 230 can be used to measure paint components. Alternatively, the disposable cup and reusable cup holder can be used on a scale, or with a measuring stick to measure the paint components.

The indicia can include mixing scales with one or more mixing ratios, e.g., 4:1 mixing ratio, 2:1 mixing ratio; 3:2:1 mixing ratio, etc. Each mixing ratio might include one or more different sized divisions so that different amounts of fluid could be measured using each mixing ratio. The indicia can also include one or more universal scales, i.e., scales with equal sized divisions. One universal scale might have 20 equal divisions, another 10 equal divisions, a third 5 equal divisions. There can be as many universal scales as needed. The multiple universal scales allow the user to measure different amounts of fluid without using the mixing ratio scales, which would not have to be included. The user could select the appropriate universal scale based on the amount of fluid needed.

Alternatively, the measuring guide could have indicia printed on a clear, thin, flat, plastic sheet. The plastic sheet has connecting parts on opposite sides of the sheet, including, but not limited to, tabs and slots. The plastic sheet is formed into a cylinder, and the tabs are inserted into the slots. The measuring guide can be placed on the table, and the disposable cup, or the reusable cup holder with the disposable cup in it, can be placed inside the cylinder. After the paint components are measured, the disposable cup (and the reusable cup holder if present) is removed from the cylinder. This can be done by lifting the disposable cup by the flange, or by disconnecting the tabs and slots on the sheet. Optional removal tabs on the flange 180 degrees apart can assist in removing the disposable cup. The disposable cup can then be placed in the reusable cup holder (if not already there). This measuring guide improves visibility and accuracy in measuring the paint components. The rectangular shape is easy to manufacture. It eliminates the necessity for accurate placement of a label on the disposable cup or reusable cup holder. It also allows more direct viewing of the indicia than with the label (i.e., through the label, the reusable cup holder, and the disposable cup). It is particularly advantageous when a smaller diameter disposable cup is used because the indicia can be placed right next to the disposable cup. Finally, if the disposable cup is used alone, the reusable cup holder stays cleaner because it is not used when pouring and measuring paint.

The sheets may be formed in different sizes so that the measuring guides can be used with different sizes of disposable cups. A larger sheet could be used with the reusable cup holder and/or the larger disposable cup. The cylinder formed by the larger sheet is big enough so that the reusable cup holder and/or the larger disposable cup fit inside. The larger sheet could include a marking, such as a dotted line near the bottom, to allow proper alignment of the indicia depending whether the larger disposable cup is used with the reusable cup holder or not. The entire sheet might be used when the larger disposable cup is used with a reusable cup holder having legs. When the larger disposable cup is used alone (or the reusable cup does not affect the alignment, e.g. because it does not have legs), the sheet could be cut at the marking. This allows proper alignment in either situation. A smaller sheet could be used when a smaller disposable cup is used. The reusable cup holder would not generally be used with the smaller disposable cup when measuring fluid in order to provide proper alignment of the indicia and the smaller disposable cup.

After the disposable cup 55 is filled with paint, the disposable lid 130 is placed on top of the disposable cup 55. The angle γ of the edge 140 of disposable lid 130 is substantially the same as the angle α of the flange 85 of disposable cup 55 so that the edge 140 of disposable lid 130 mates with the flange 85 of the disposable cup 55. The angle γ centers the disposable lid 130 on the disposable cup 55. The angle γ of the disposable lid 130 also allows for additional sealing area without an increase in the overall outside diameter of the fluid supply assembly.

Figure 19:
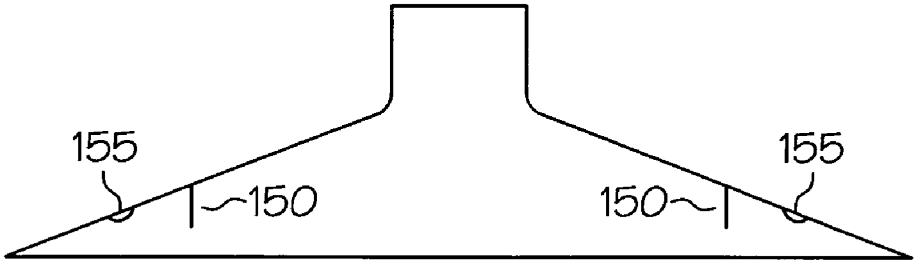
FIG. 19 is a side sectional view of one embodiment of the disposable lid.

The downward extending rib 150 (shown in FIG. 19) on the inside of the disposable lid 130 fits inside the disposable cup 55. There can be one or more downward extending ribs 150 around the disposable lid 130 which extend part way around the inside of the disposable lid 55, or the rib can extend all the way around. The downward extending rib 150 keeps the disposable lid 55 in place, and it can also act as a seal. The disposable lid 55 can also have a downwardly extending sealing bead 155 which contacts the flange 85 of the disposable cup 55 to improve sealing.

The reusable outer lid 170 is placed on top of the disposable lid 130. It is tightened to the reusable cup holder 90 using the connecting surface 125 of the reusable cup holder 90 and the complementary connecting surface 190 of the reusable outer lid 170. Suitable connecting surfaces and complementary connecting surfaces include, but are not limited to, threaded connections, lugs and grooves, and pins and slots.

The outer edge 180 of the reusable outer lid 170 has an angle δ which is substantially the same as the angle β of the flange 120 of reusable cup holder 90. The tightening of the reusable outer lid 170 to the reusable cup holder 90 clamps the edge 140 of disposable lid 130 and flange 85 of disposable cup 55 together between edge 180 of reusable outer lid 170 and flange 120 of reusable cup holder 90. The angle increases the clamping force without an increase in torque.

The angles α of the flange 85 of disposable cup 55, γ of the edge 140 of disposable lid 130, β of flange 120 of reusable cup holder 90, and δ of edge 180 of reusable outer lid 170 are generally in the range of about 10° to about 70° from the respective axis, typically about 20° to about 60°, more typically about 30° to about 50°, more about typically 35° to about 45°.

When the angles α and γ of the flange 85 of disposable cup 55 and the edge 140 of disposable lid 130 match the angle at which the fluid supply assembly is attached to the paint sprayer so that in use the disposable lid is substantially parallel to the paint axis of the paint sprayer, almost all of the paint in the disposable cup is used. Because the cost for a typical mixed paint is over $1.00 per fluid ounce, reducing paint waste is an important consideration.

A plug 235 can be used to cover the fitting 160 on the disposable lid 130. The plug 235 can fit inside or outside of the fitting 160. The plug 235 seals the opening 165 in the fitting 160 for shaking or storage.

In one embodiment, the fluid supply assembly of the present invention is strong enough to be placed in a paint shaker machine without any additional support.

The conduit 210 is placed into the fitting 195 in the reusable outer lid 170. An optional filter 220 is inserted in the opening 215 of the conduit 210. Alternatively, the filter 220 could be placed in the fitting 160 of the disposable lid 130 or the fitting 195 of the reusable outer lid 170. The filter 220 can have a projection 225, if desired, which prevents the collapsing disposable cup 55 from blocking the opening 165 through to the conduit 210. Projection 225 can also be used to remove the filter 220 for cleaning or disposal. The conduit 210 can be filled with solvent and plugged for storage, if desired. If an inside fitting plug 235 is used for the fitting 160 on the disposable cup 130, the same size plug may also fit in the conduit.

The fluid supply assembly is attached to the conduit 210. The conduit 210 connects to the reusable outer lid 170 and the paint sprayer 10 and provides a flow path from the interior 75 of the disposable cup 55 to the paint sprayer 10.

Figure 4:
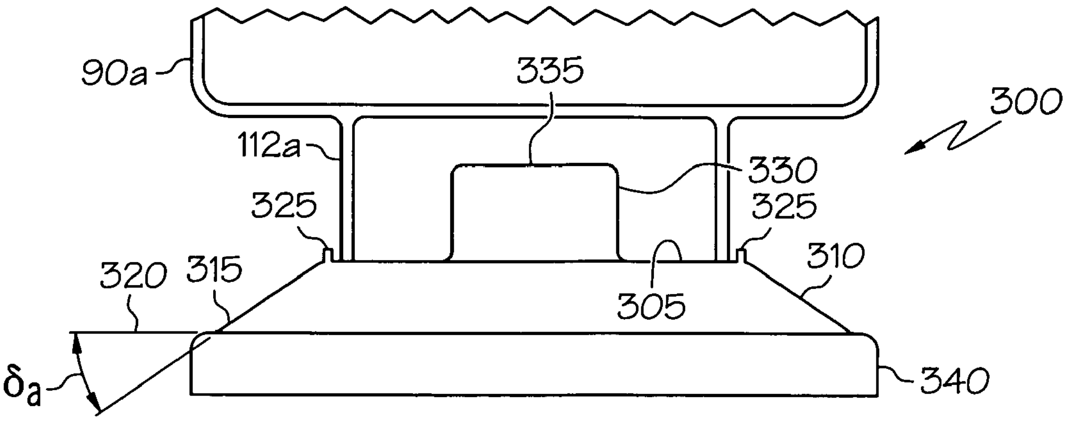
FIG. 4 is a partial side sectional view of an alternate embodiment of the reusable outer lid showing stacking of the fluid supply assemblies.

An alternate embodiment for the reusable outer lid is shown in FIG. 4. In this embodiment, the reusable outer lid 300 has an inner portion 305 and an outer portion 310. The outer portion 310 is generally frustoconical. The outer edge 315 defines an axis 320. The angle δa of the outer edge 315 is in a range of from about 110 to about 70° from the axis 320. As in the first embodiment, the angle δa is substantially the same as the angle β of flange 120 reusable cup holder 90.

The inner portion 305 is substantially flat. Alternatively, it could be at an angle different from the angle δa of the outer edge 315. It can optionally include one or more upward extending prongs 325. The prongs 325 can extend all or part of the way around the reusable outer lid 300. They can be positioned to mate with the legs 112*a* of an adjacent reusable cup holder 90*a*, allowing the fluid supply assemblies to be stacked on top of one another.

If the distance across the legs 112 of the reusable cup holder is smaller than the diameter of the lower end of the reusable cup and the reusable cup holder is to be used in a paint shaker, it may be desirable to include a second ring on the bottom of the reusable cup holder. The second ring should be the same (or substantially the same) diameter as the lower end of the reusable cup holder in order to transfer the paint shaker's clamping force to the side wall of the reusable cup holder, reducing deflection of the bottom of the reusable cup holder.

The reusable outer lid has a fitting 330 integrally connected to the inner portion 305. The fitting 330 has an opening 335 extending through it.

The outer edge 315 of the reusable outer lid 300 mates with the flange 120 of the reusable cup holder 90. There is a complementary connecting surface 340 at the outer edge 315 of the reusable outer lid 300. The complementary connecting surface 340 mates with the connecting surface 125 of the reusable cup holder 90 to seal the reusable cup holder 90 and reusable outer lid 300 together.

Figure 5:
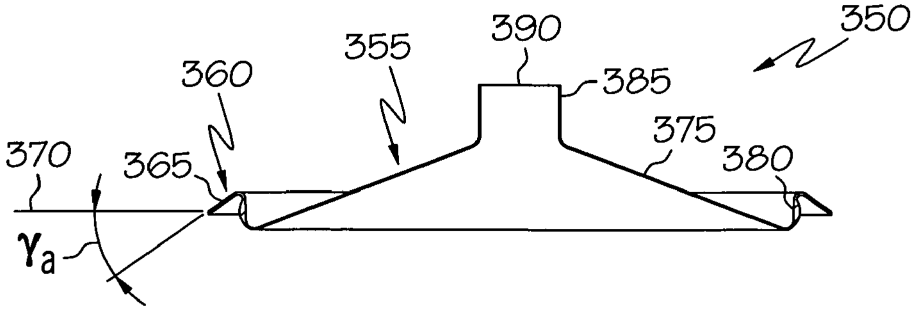
FIG. 5 is a side sectional view of an alternate embodiment of the disposable lid.
Figure 6:
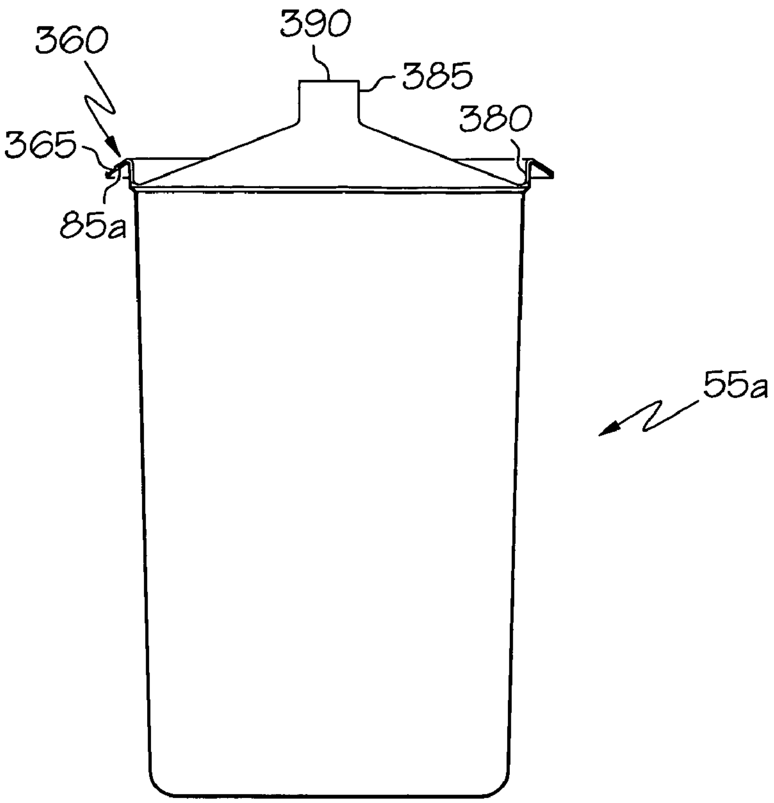
FIG. 6 is an assembled side sectional view of the alternate embodiment of the disposable lid of FIG. 5 and the disposable cup.

An alternative embodiment of the disposable lid is shown in FIGS. 5-6. The disposable lid 350 has an inner portion 355 and an outer portion 360. The outer portion 360 is generally frustoconical. The outer edge 365 of the outer portion 360 defines an axis 370. The angle γa of the outer edge 365 of the outer portion 360 is in a range of from about 10° to about 70° from the axis 370. As in the first embodiment, the angle γa is substantially the same as the angle α of the flange 85*a* of disposable cup 55*a*.

The inner portion 355 has a generally frustoconical part 375 and an upwardly extending projection 380 at the outer end. The upwardly extending projection 380 is connected to the outer portion 360. There is a fitting 385 integrally connected to the inner portion 355. The fitting 385 has an opening 390 extending through it.

The outer portion 360 mates with the flange 85 of the disposable cup 55. The upwardly extending projection 380 fits inside the outlet end 65 the disposable cup 55 forming an additional seal.

Figure 7:
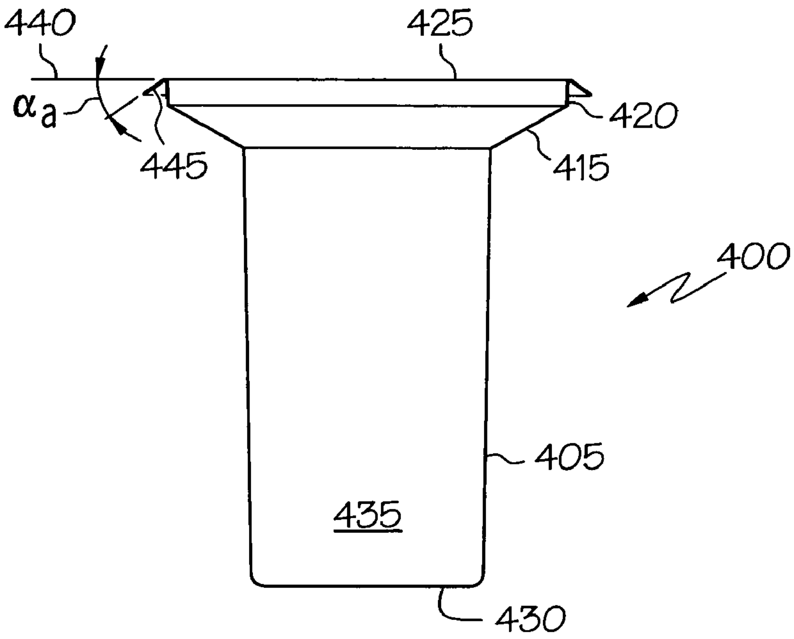
FIG. 7 is a side sectional view of an alternate embodiment of the disposable cup.

Alternate embodiments of the disposable cup are shown in FIGS. 7-10. In FIG. 7, the disposable cup 400 has a generally cylindrical lower side wall portion 405, a generally frustoconical intermediate side wall portion 415, and a generally cylindrical upper side wall portion 420.

The outlet end 425 at the top of the disposable cup 400 is open, and the bottom 430 is closed. The lower side wall portion 405, intermediate side wall portion 415, and upper side wall portion 420, outlet end 425, and bottom 430 define an interior 435. The interior 435 is smaller than the interior 75. The smaller diameter of the lower side wall portion allows accurate measuring of the paint ratios when less paint is to be used.

The outlet end 425 defines an axis 440. There is a flange 445 extending outward and downward from the edge of the outlet end 425. The flange 445 extends downward at an angle αa in a range of from about 110 to about 70° from the axis 440 of the outlet end 425. The outlet end 425 is adapted to be placed into the reusable cup holder, so it sized to fit in the reusable cup holder.

Alternatively, the generally cylindrical lower side wall portion could be off centered, i.e., not concentric with the upper side wall portion. This would bring the lower side wall portion close to the side wall of the reusable cup holder, allowing easy reading of any measuring indicia.

Figure 8:
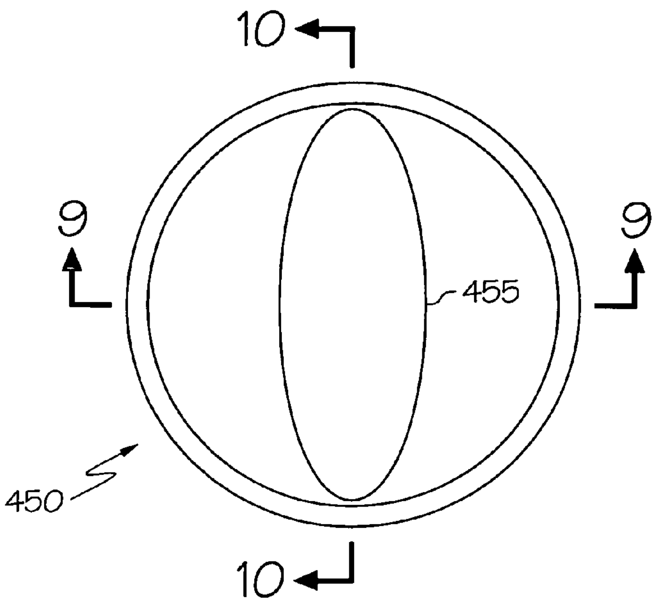
FIG. 8 is a top view of an alternate embodiment of the disposable cup.
Figure 9:
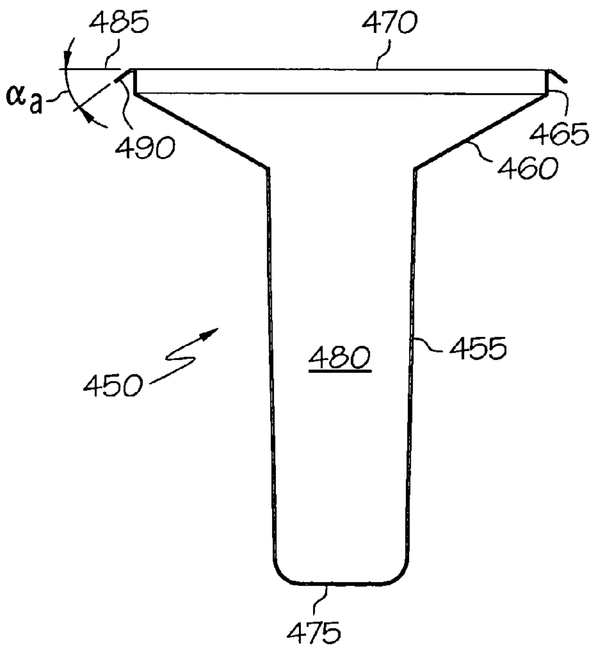
FIG. 9 is a side sectional view of the disposable cup of FIG. 8 along line 9-9 of FIG. 8.
Figure 10:
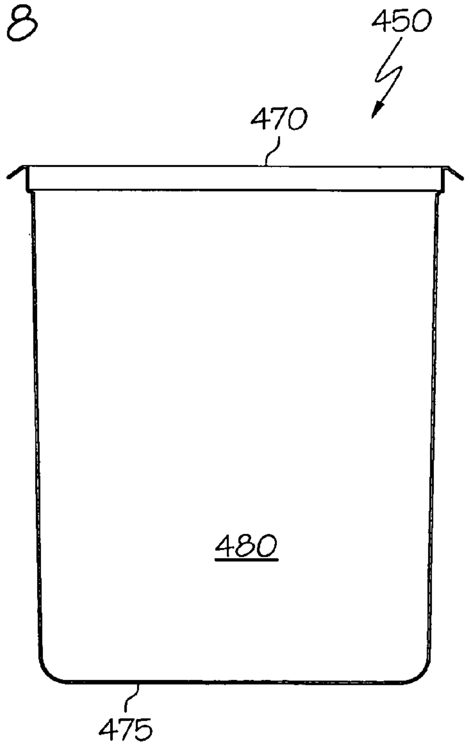
FIG. 10 is a side sectional view of the disposable cup of FIG. 8 along line 10-10 of FIG. 8.
Figure 11:
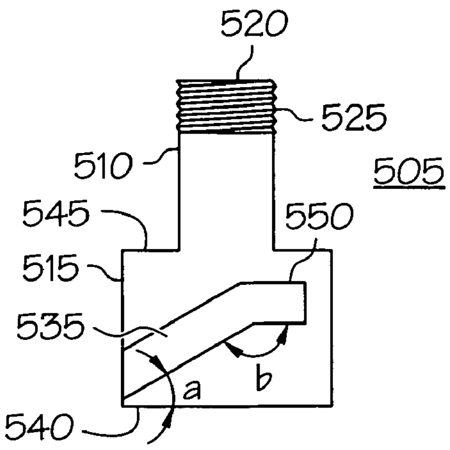
FIG. 11 is a side view of one embodiment of the adapter.

In FIGS. 8-10, the disposable cup 450 has a generally elliptical lower side wall portion 455, and intermediate side wall portion 460 extending from the lower side wall portion to the generally cylindrical upper side wall portion 465.

The outlet end 470 at the top of the disposable cup 450 is open, and the bottom 475 is closed. The lower side wall portion 455, intermediate side wall portion 460, and upper side wall portion 465, outlet end 470, and bottom 475 define an interior 480. The interior 480 is smaller than the interior 75. The elliptical shape makes it easier to read the indicia for measuring paint because the disposable cup extends close to the reusable cup holder. The longer axis of the ellipse can extend all or substantially all the way across the diameter of the reusable cup holder, or something less than all or substantially all the way across the diameter.

The outlet end 470 defines an axis 485. There is a flange 490 extending outward and downward from the edge of the outlet end 470. The flange 490 extends downward at an angle αa in a range of from about 10° to about 70° from the axis 485 of the outlet end 470. The outlet end 470 is adapted to be placed into the reusable cup holder, so it sized to fit in the reusable cup holder.

In these embodiments, the distance across the outlet end of the disposable cup is greater than the distance across the bottom in at least one direction. The smaller portion of the disposable cup can extend the entire height of the side wall or less than the entire height of the side wall. If the side wall is cylindrical, and the smaller diameter portion extends the entire height of the sidewall, it can be connected to the flange by a flat annular portion. If it does not extend the entire height of the side wall, it can be can be connected by a generally frustoconical upper side wall portion. Other side wall arrangements are possible, as are well known to those of skill in the art.

This embodiment of the disposable cup can be used with the reusable cup holder and outer lid and disposable lid without any modification to the assembly, allowing different sizes of disposable cups to be used in the fluid supply assembly.

The fluid supply assembly has been shown and described with the disposable cup and reusable cup holder being generally cylindrical, which is a typical shape because of ease of manufacture and use. However, it could be made in other shapes, including, but not limited to, square, triangular, pentagonal, elliptical, etc.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. An adapter assembly for connecting a fluid supply assembly to a fluid applicator comprising:

an outer lid for the fluid supply assembly, the outer lid having a lid portion and an integral generally cylindrical fitting with an opening therethrough, the fitting having a connector on an inner surface, the connector selected from projections extending from the inner surface toward the centerline of the fitting or grooves in the inner surface; and an adapter having a first end and a second end, and a bore between the first end and the second end, the first end having a connecting surface adapted to mate with a complementary connecting surface on the fluid applicator, the second end being generally cylindrical and having a top adjacent to the first end and a bottom at an opposite end from the top, the second end having a complementary connector on an outer surface, the complementary connector selected from complementary grooves in the outer surface or complementary projections extending outward from the outer surface, the complementary connector adapted to mate with the connector on the fitting, wherein the complementary grooves mate with the projections, and the complementary projections mate with the grooves.

2. The adapter assembly of claim 1 wherein the complementary connector is a complementary groove, and the complementary groove extends from the bottom of the second end of the adapter toward the top of the second end, or wherein the connector is a groove, and the groove extends from the top of the fitting toward the bottom.

3. The adapter assembly of claim 1 wherein the connector is a groove or the complementary connector is a complementary groove, and wherein the groove or the complementary groove forms a helix.

4. The adapter assembly of claim 1 wherein the complementary connector is a complementary groove, and wherein the complementary groove is formed at a first angle from a plane of the bottom of the second end of the adapter, or wherein the connector is a groove, and the groove is formed at a first angle from a plane of the top of the fitting.

5. The adapter assembly of claim 1 wherein the complementary connector is a complementary groove, and wherein the complementary groove has an additional portion near the top of the second end of the adapter, the additional portion extending at a second angle from a plane of the complementary groove, or wherein the connector is a groove, and the groove has an additional portion near the bottom of the fitting, the additional portion extending at a second angle from a plane of the groove.

6. The adapter assembly of claim 5 wherein the additional portion of the complementary groove extends parallel to a plane of the bottom of the second end or the additional portion of the groove extends parallel to a plane of the top of the fitting.

7. The adapter assembly of claim 1 wherein the connector is a projection and the complementary connector is a complementary groove.

8. The adapter assembly of claim 1 wherein the connector is a groove and the complementary connector is a complementary projection.

9. The adapter assembly of claim 1 wherein the fitting extends upward from the lid portion of the outer lid.

10. The adapter assembly of claim 1 wherein the fitting extends below the lid portion of the outer lid toward the bottom of the outer lid.

11. The adapter assembly of claim 1 wherein the projection is positioned below the top of the fitting, or the complementary projection is positioned above the bottom of the second end.

12. The adapter assembly of claim 1 wherein a portion of the bottom of the fitting is smaller than the top of the fitting to provide an interference fit with the adapter.

13. The adapter assembly of claim 1 wherein the first end is generally cylindrical.

14. The adapter assembly of claim 1 wherein the adapter is made of metal.

15. The adapter assembly of claim 1 wherein the outer lid is made of plastic.

16. The adapter assembly of claim 1 wherein the connecting surface and complementary connecting surface are selected from threads, lugs and grooves, tapered connections, bayonet connections, or snap connections.

17. The adapter assembly of claim 1 wherein a diameter of the second end is greater than a diameter of the first end.

18. The adapter assembly of claim 2 further comprising a disposable lid having an integral generally cylindrical fitting with an opening therethrough, the fitting of the disposable lid adapted to fit inside the bore of the adapter when the adapter is locked to the outer lid, the opening of the disposable lid being in fluid communication with the bore of the adapter.

19. The adapter assembly of claim 1 wherein there are at least two connectors and at least two complementary connectors.

20. The adapter assembly of claim 1 wherein the fluid supply assembly is a paint supply assembly and wherein the fluid applicator is a paint sprayer.

21. An adapter assembly for connecting a fluid supply assembly to a fluid applicator comprising:

an outer lid for the fluid supply assembly, the outer lid having a lid portion and an integral generally cylindrical fitting with an opening therethrough, the fitting having a connector on an inner surface, the connector selected from projections extending from the inner surface toward the centerline of the fitting or grooves in the inner surface;

an adapter having a first end and a second end, and a bore between the first end and the second end, the first end having a connecting surface adapted to mate with a complementary connecting surface on the fluid applicator, the second end being generally cylindrical and having a top adjacent to the first end and a bottom at an opposite end from the top, the second end having a complementary connector on an outer surface, the complementary connector selected from complementary grooves in the outer surface or complementary projections extending outward from the outer surface, the complementary connector adapted to mate with the connector on the fitting, wherein the complementary grooves mate with the projections, and the complementary projections mate with the grooves; and a disposable lid having an integral generally cylindrical fitting with an opening therethrough, the fitting of the disposable lid adapted to fit inside the bore of the adapter when the adapter is locked to the outer lid, the opening of the disposable lid being in fluid communication with the bore of the adapter.

* * * * *